Jan. 21, 1936.  T. R. ARDEN  2,028,582
TOY MECHANICAL SHOVEL
Filed Sept. 21, 1935   2 Sheets-Sheet 2
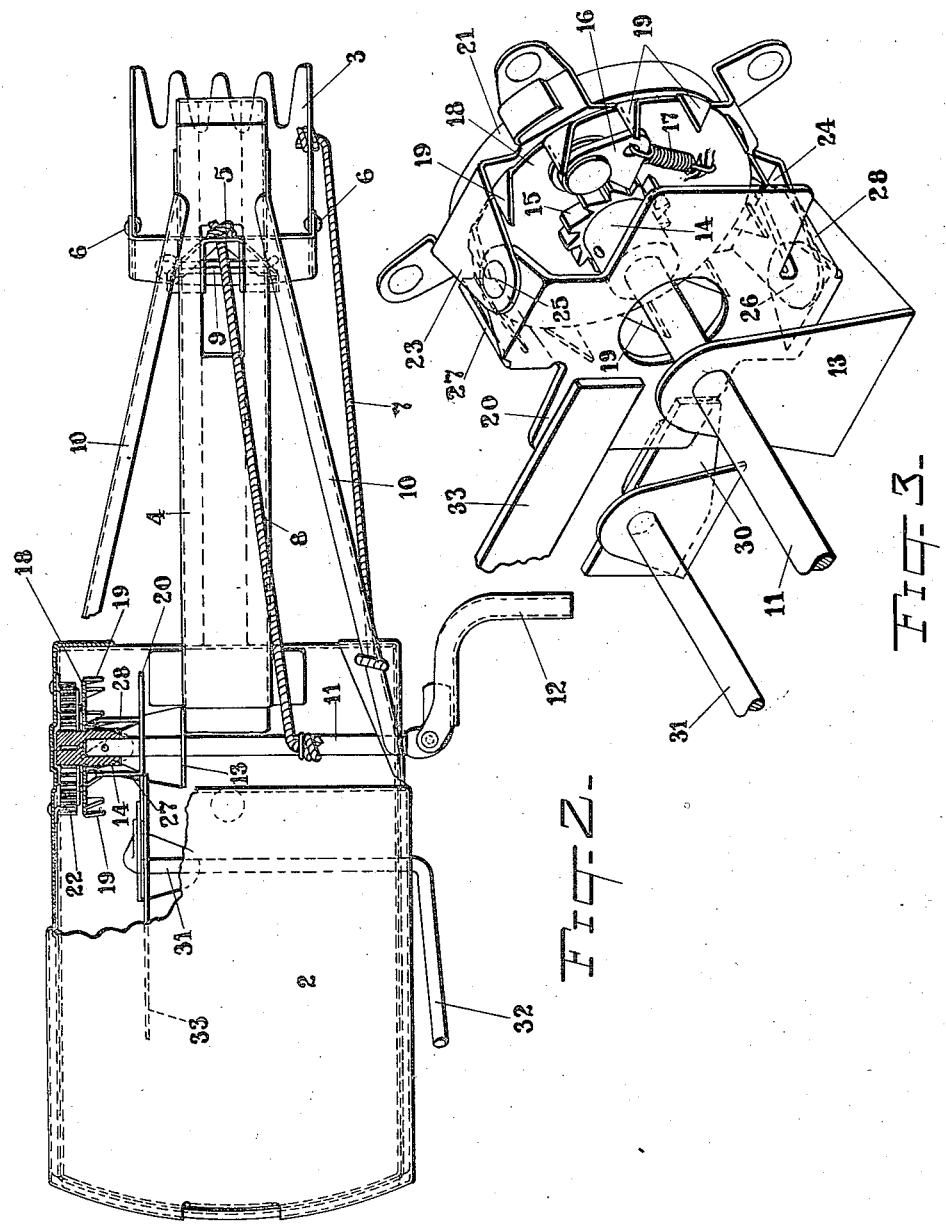
INVENTOR
T. R. Arden
by Merrill M. Blackburn
ATTORNEY Patented Jan. 21, 1936

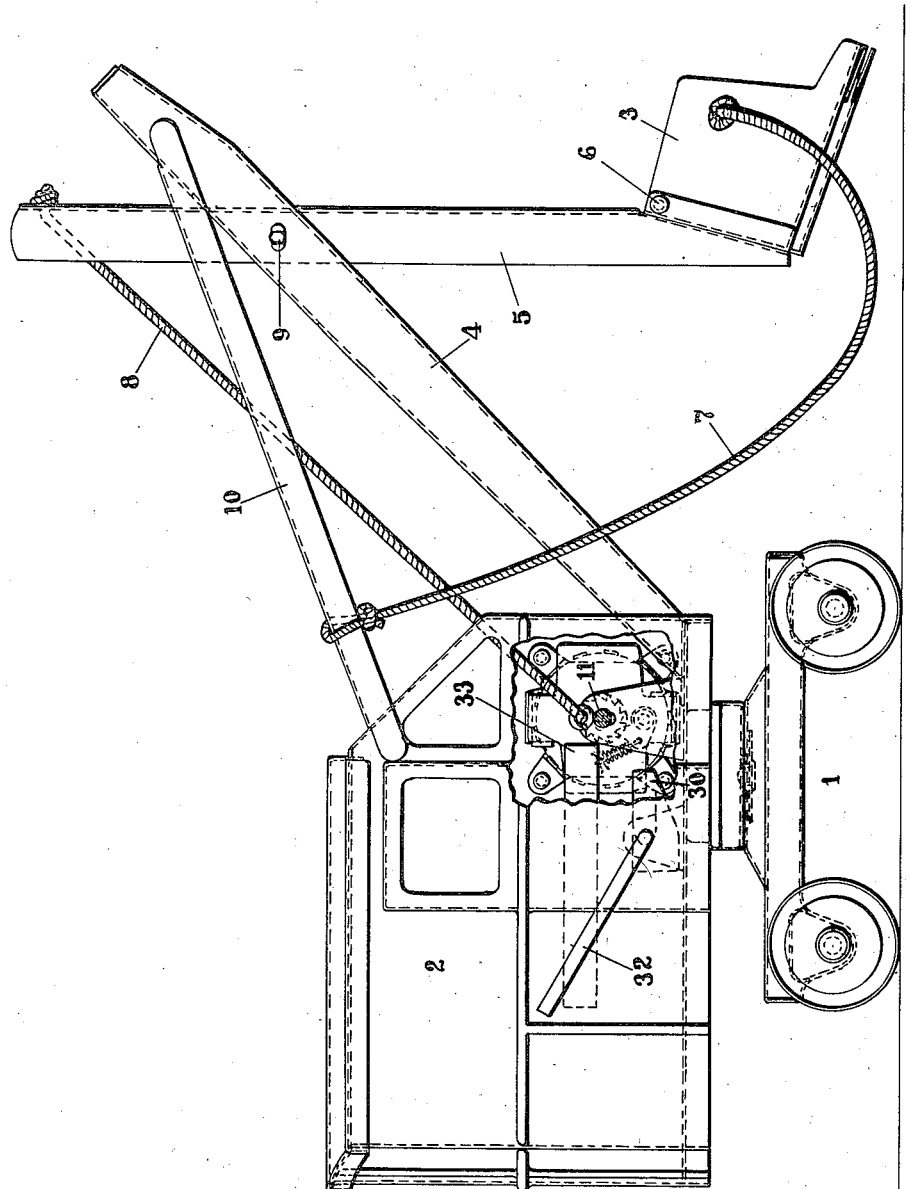

2,028,582

UNITED STATES PATENT OFFICE 2,028,582

TOY MECHANICAL SHOVEL

Thomas R. Arden, Baldwin, N. Y., assignor to Buddy "L" Manufacturing Company, East Moline, Ill.

Application September 21, 1935, Serial No. 41,599

5 Claims. (Cl. 46—40)

The present invention relates to a mechanical toy which, in its operation, resembles a steam shovel. Among the objects of this invention are to provide a mechanical toy which is inexpensive and which will simulate as nearly as may be the noises of a mechanical shovel when it is operating; to provide, in a toy of the character indicated, improved mechanism for giving the sound effect of a steam shovel; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents, in elevation, partly broken away, a structure embodying the present invention;

Fig. 2 represents, in plan view, partly broken away, the apparatus shown in Fig. 1;

Fig. 3 represents a fragmentary perspective view of the operating mechanism of this invention.

Reference will now be made in greater detail to the annexed drawings for a more complete description of this invention. The truck is indicated at 1, the cab at 2, the shovel at 3, the boom at 4, and the beam on which the shovel is carried at 5. The shovel 3 is pivotally mounted at 6 upon the beam 5, and may be turned about its pivot 6 by the cord 7, when this is desired. A cord 8 is connected to the upper end of the beam 5 which is pivoted at 9 to the boom 4. Braces 10 connect the cab 2 with the upper portion of the boom 4. The boom is rigidly attached to the forward end of the cab and is braced in its position on the cab by the braces 10.

A shaft 11 provided with a crank 12 extends through one side of the cab and nearly across the same. Near the middle of the forward end of the cab the shaft 11 passes through a support 13 in which it has a bearing. On the extreme inner end of the shaft 11 is a bushing 14 carrying a rachet 15 with which a pawl 16, actuated by the spring 17, cooperates. A disk 18 provided with teeth 19 is pivotally mounted on the sleeve or bushing 14 and cooperates with the clapper 20 of the escapement mechanism. A casing 21 containing the spring 22 is rigidly mounted on the wall of the cab in line with the shaft 11. Arms 23 and 24 project inwardly from the casing 21 and furnish a support for the clapper 20 which is pivotally connected thereto at 25 and 26. One end of spring 22 is secured to bushing 14 which is secured to the end of shaft 11. The other end of the spring is fastened to the casing 21 which is, in turn, secured to the cab. When the spring 22 unwinds, it rotates shaft 11 and winds up cord 8, thus raising the shovel.

Arms 27 and 28 extend from the clapper 20 toward the disc 18 and cooperate with the teeth 19 in permitting the spring 22 to run down slowly after it has been wound up. A latch 30 mounted on a shaft 31 carrying a lever 32 interrupts the action of the clapper 20 and prevents oscillation thereof, and also raising of the shovel 3 when it is desired to stop same as it is rising. The clapper 20, as it oscillates, causes the strip 33, which is carried thereby, to strike against the cab wall, making a noise simulating the mechanical noises produced during the operation of a steam shovel. Turning the crank 12 winds up the spring 22 and unwinds the cord 8, thus lowering the shovel, and then, when the lever 32 is raised, the stop or latch 30 is removed from the path of the clapper 20 and the latter is permitted to oscillate on its pivots 25 and 26. This permits the escapement mechanism to operate and the spring 22 to unwind, resulting in the cord 8 being wound up on the shaft 11 and the shovel being raised.

When the crank 12 is turned, the shaft 11 is rotated and the ratchet 15 turns under the pawl 16, winding up the spring 22. The pawl and ratchet prevent the spring from unwinding when the chank is left free. Now, when the lever 32 is turned to rotate the shaft 31, the latch 30 is turned down out of the way of the clapper 20 which is permitted to oscillate back and forth on its pivots 25 and 26.

It is of course understood that the specific description of structure set forth above may be departed from without departing from the spirit of this invention as set forth herein and in the appended claims.

Having now described my invention, I claim:

1. In a toy mechanical shovel, a shovel, mechanism for raising and lowering the shovel, a clapper for producing a noise, and mechanism connected with the raising mechanism for operating the clapper.

2. In a toy mechanical shovel, a shovel, a spring motor for raising said shovel, escapement mechanism for regulating the rate of operation of the shovel, and noise mechanism connected with the escapement mechanism and adapted to simulate the noise of a shovel.

3. In a top, a part to be operated, motive means to operate said part, noise producing mechanism connected with said motive means, and escapement mechanism connected with said motive means to regulate the speed of operation thereof, the escapement mechanism causing operation of the noise producing mechanism.

4. A structure as defined by claim 3 in which the noise producing mehanism comprises a clapper oscillated by the escapement mechanism and an abutment to be struck by the clapper as it oscillates.

5. A structure as defined by claim 3 in which the noise producing mechanism comprises a clapper and an abutment to be struck by the clapper as it oscillates, in combination with a latch to prevent the oscillation of the clapper when it is not desired that the toy shall operate.

THOMAS R. ARDEN.

CERTIFICATE OF CORRECTION.

Patent No. 2,028,582. January 21, 1936.

THOMAS R. ARDEN.

It is hereby certified that error appears in the printed specification of the above numbered patent requiring correction as follows: Page 2, first column, line 5, claim 3, for "top" read toy; and that the said Letters Patent should be read with this correction therein that the same may conform to the record of the case in the Patent Office.

Signed and sealed this 25th day February, A. D. 1936.

Leslie Frazer (Seal) Acting Commissioner of Patents.